US010288249B2

(12) United States Patent
Salter et al.

(10) Patent No.: US 10,288,249 B2
(45) Date of Patent: May 14, 2019

(54) PATTERN STYLING FOR REDUCING GLARE IN VEHICLE LIGHTING ASSEMBLIES

(71) Applicant: Ford Global Technologies, LLC, Dearborn, MI (US)

(72) Inventors: Stuart C. Salter, White Lake, MI (US); Paul Kenneth Dellock, Northville, MI (US); Aaron Bradley Johnson, Allen Park, MI (US); Stephen Kenneth Helwig, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/660,200

(22) Filed: Jul. 26, 2017

(65) Prior Publication Data

US 2019/0032883 A1 Jan. 31, 2019

(51) Int. Cl.
| | | |
|---|---|---|
| F21S 43/33 | (2018.01) | |
| F21S 43/20 | (2018.01) | |
| B60Q 1/04 | (2006.01) | |
| B29C 33/42 | (2006.01) | |
| B29D 11/00 | (2006.01) | |
| F21S 43/31 | (2018.01) | |
| F21V 9/30 | (2018.01) | |
| F21S 43/27 | (2018.01) | |
| F21S 43/14 | (2018.01) | |
| F21Y 115/10 | (2016.01) | |

(52) U.S. Cl.
CPC .......... *F21S 43/26* (2018.01); *B29C 33/424* (2013.01); *B29D 11/00769* (2013.01); *B60Q 1/04* (2013.01); *F21S 43/14* (2018.01); *F21S 43/27* (2018.01); *F21S 43/31* (2018.01); *F21S 43/33* (2018.01); *F21V 9/30* (2018.02); *F21Y 2115/10* (2016.08)

(58) Field of Classification Search
CPC .. F21S 43/26; F21S 43/33; F21S 43/14; F21S 43/27; F21S 43/31; F21S 48/215; F21S 48/2206; F21S 48/2212; F21S 48/234; F21S 48/238; B29D 11/00769; B29C 33/424; F21V 9/16; F21V 9/30; F21V 7/22; B60Q 1/04
See application file for complete search history.

(56) References Cited

U.S. PATENT DOCUMENTS

| | | | |
|---|---|---|---|
| 5,251,064 A * | 10/1993 | Tennant | F21V 7/22 362/296.04 |
| 5,305,135 A | 4/1994 | Chovan | |
| 5,985,465 A | 11/1999 | Daichou et al. | |
| 6,183,102 B1 * | 2/2001 | Mortz | F21V 9/30 362/800 |
| 6,234,648 B1 * | 5/2001 | Borner | F21V 7/22 362/235 |
| 7,048,423 B2 | 5/2006 | Stepanenko et al. | |
| 8,258,681 B2 * | 9/2012 | Lee | F21K 9/233 362/264 |

(Continued)

*Primary Examiner* — Y M. Lee
(74) *Attorney, Agent, or Firm* — Carlson, Gaskey & Olds (57) ABSTRACT

A vehicle lighting assembly includes a lighting component, a metallic layer formed on a first portion of the lighting component to establish a reflective surface, a micro-pattern formed on a second portion of the lighting component to establish a non-reflective surface, and a coating that includes a phosphor mixture applied to the micro-pattern.

19 Claims, 6 Drawing Sheets

(56) References Cited

U.S. PATENT DOCUMENTS

| | | | |
|---|---|---|---|
| 8,282,998 B2 | 10/2012 | Lefevre et al. | |
| 9,749,873 B1 | 8/2017 | Chang et al. | |
| 2007/0147049 A1* | 6/2007 | Collins | F21V 7/06 362/347 |
| 2009/0323350 A1* | 12/2009 | Deng | F21V 7/09 362/296.01 |
| 2010/0085750 A1* | 4/2010 | Van Ostrand | G02B 6/0028 362/235 |
| 2010/0195306 A1 | 8/2010 | Helbing et al. | |
| 2012/0243256 A1* | 9/2012 | Lee | F21K 9/61 362/609 |
| 2013/0229807 A1* | 9/2013 | Huang | F21S 8/086 362/296.07 |
| 2014/0375959 A1* | 12/2014 | Yang | F21V 14/08 362/84 |
| 2016/0290584 A1 | 10/2016 | Nomura et al. | |
| 2017/0273360 A1* | 9/2017 | Brinkley | A24F 7/00 |

\* cited by examiner

PATTERN STYLING FOR REDUCING GLARE IN VEHICLE LIGHTING ASSEMBLIES

TECHNICAL FIELD

This disclosure relates to vehicle lighting assemblies and methods that provide patterns on lighting components for both reducing glare and increasing the aesthetic appearance of the vehicle.

BACKGROUND

Vehicle lighting systems include a multitude of lighting and signaling devices for illuminating the vehicle and alerting others of the vehicle's presence and driving intentions. These lighting systems typically include various lighting assemblies positioned at the front and rear of the vehicle. Some lighting assemblies include various reflector bodies and bezels for reducing glare. However, the reflector bodies and bezels often detract from rather than increase the aesthetic appearance of the vehicle.

SUMMARY

A vehicle lighting assembly according to an exemplary aspect of the present disclosure includes, among other things, a lighting component, a metallic layer formed on a first portion of the lighting component to establish a reflective surface, a micro-pattern formed on a second portion of the lighting component to establish a non-reflective surface, and a coating that includes a phosphor mixture applied to the micro-pattern.

In a further non-limiting embodiment of the foregoing vehicle lighting assembly, the lighting component is a reflector body or a bezel of the vehicle lighting assembly.

In a further non-limiting embodiment of either of the foregoing vehicle lighting assemblies, the first portion is a rear surface of the lighting component.

In a further non-limiting embodiment of any of the foregoing vehicle lighting assemblies, the second portion is a ledge of the lighting component.

In a further non-limiting embodiment of any of the foregoing vehicle lighting assemblies, the metallic layer is a partially vacuum metalized film or a direct metallization layer.

In a further non-limiting embodiment of any of the foregoing vehicle lighting assemblies, the assembly includes a light source for emitting light through the lighting component.

In a further non-limiting embodiment of any of the foregoing vehicle lighting assemblies, the light source is a light emitting diode (LED).

In a further non-limiting embodiment of any of the foregoing vehicle lighting assemblies, the micro-pattern includes a diffraction grating.

In a further non-limiting embodiment of any of the foregoing vehicle lighting assemblies, the diffraction grating includes a plurality of ridges.

In a further non-limiting embodiment of any of the foregoing vehicle lighting assemblies, the lighting component includes a housing and a lens supported by the housing.

In a further non-limiting embodiment of any of the foregoing vehicle lighting assemblies, the phosphor mixture includes at least one phosphorescent material.

In a further non-limiting embodiment of any of the foregoing vehicle lighting assemblies, the phosphor mixture includes a long persistence phosphor.

A method according to another exemplary aspect of the present disclosure includes, among other things, molding a lighting component of a vehicle lighting assembly. Molding the lighting component forms a micro-pattern in a first portion of the lighting component. The method may further include metalizing a second portion of the lighting component, and applying a coating that includes a phosphor mixture to the micro-pattern.

In a further non-limiting embodiment of the foregoing methods, molding the lighting component includes molding the lighting component within a mold having a laser etched pattern for forming the micro-pattern.

In a further non-limiting embodiment of either of the foregoing methods, molding the lighting component includes heating the mold.

In a further non-limiting embodiment of any of the foregoing methods, metalizing the second portion of the lighting component includes applying a metallic layer to the second portion using a partial vacuum deposition technique.

In a further non-limiting embodiment of any of the foregoing methods, the first portion of the lighting component is a ledge and the second portion of the lighting component is a rear surface.

In a further non-limiting embodiment of any of the foregoing methods, the lighting component is a reflector body or a bezel of the vehicle lighting assembly.

In a further non-limiting embodiment of any of the foregoing methods, the coating includes a long persistence phosphor.

In a further non-limiting embodiment of any of the foregoing methods, the micro-pattern establishes a substantially non-reflective surface of the lighting component.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle lighting assemblies and methods that provide lighting components with patterns for reducing glare and increasing the aesthetic appearance of the vehicle. An exemplary vehicle lighting assembly includes a lighting component, a metallic layer formed on a first portion of the lighting component to establish a reflective surface, a micro-pattern formed on a second portion of the lighting component to establish a non-reflective surface, and a coating that includes a phosphor mixture applied to the micro-pattern. A method for manufacturing such a lighting component is also disclosed. These and other features of this disclosure are described in greater detail below.

Figure 1:
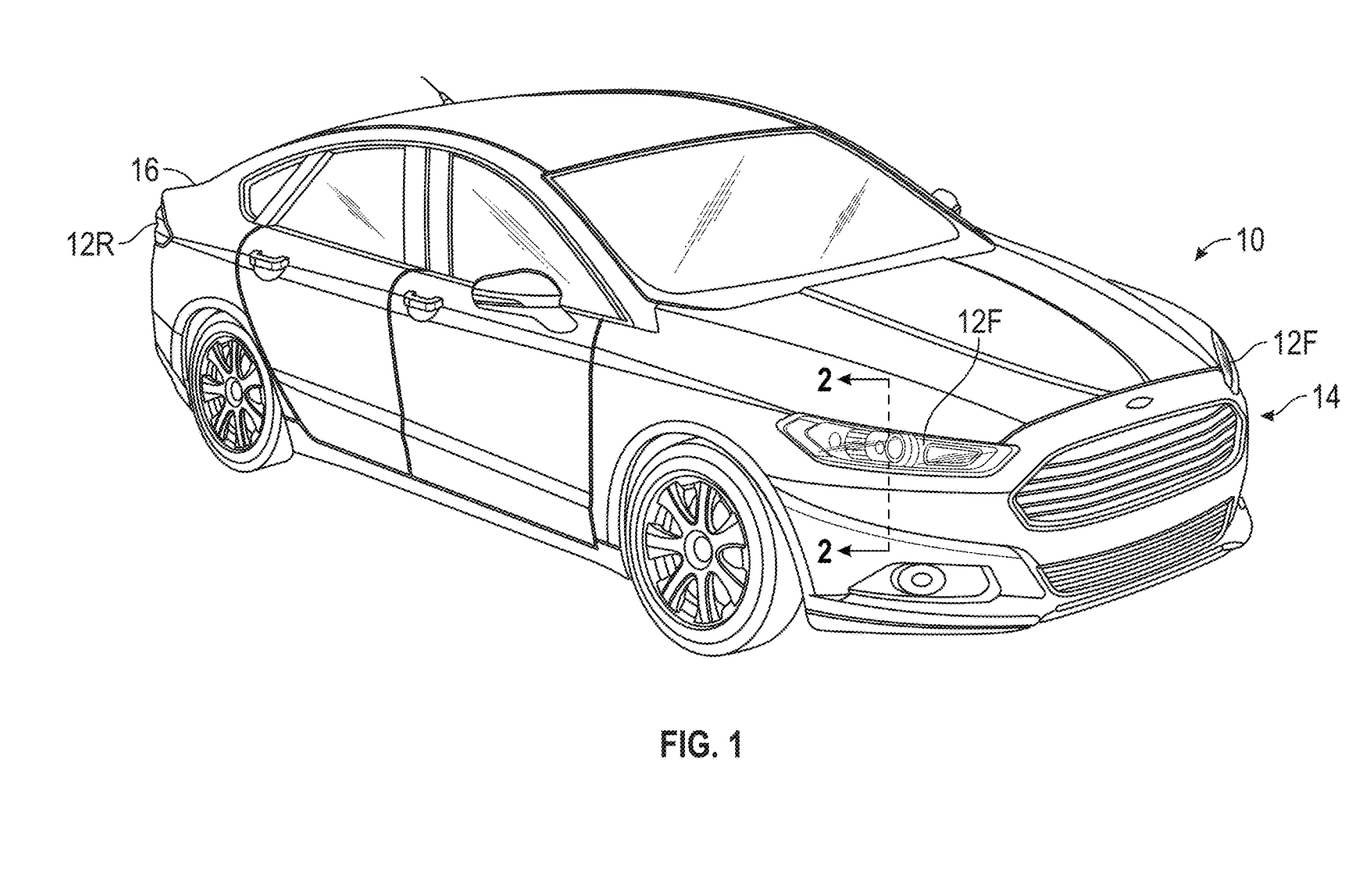
FIG. 1 illustrates a vehicle equipped with various lighting assemblies.

FIG. 1 schematically illustrates a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may be equipped with one or more lighting assemblies 12F located near a front portion 14 of the vehicle 10, and one or more lighting assemblies 12R located near a rear portion 16 of the vehicle 10. It should be understood that multiple lighting assemblies could be located at various other locations of the vehicle. Each lighting assembly 12F, 12R may include a multitude of lamps and signaling devices for providing exterior vehicle lighting and for alerting other drivers and/or pedestrians of the vehicle's 10 presence and to the driving intentions of the vehicle 10. Together, the lighting assemblies 12F, 12R establish an exterior lighting system of the vehicle 10 for producing various lighting functions, including but not limited to, high and low beam lighting, turn lights, fog lights, daytime running lights, etc. For the purposes of this disclosure, the lighting assemblies 12F, 12R will be referred to together hereinafter by using reference numeral '12'.

Figure 2:
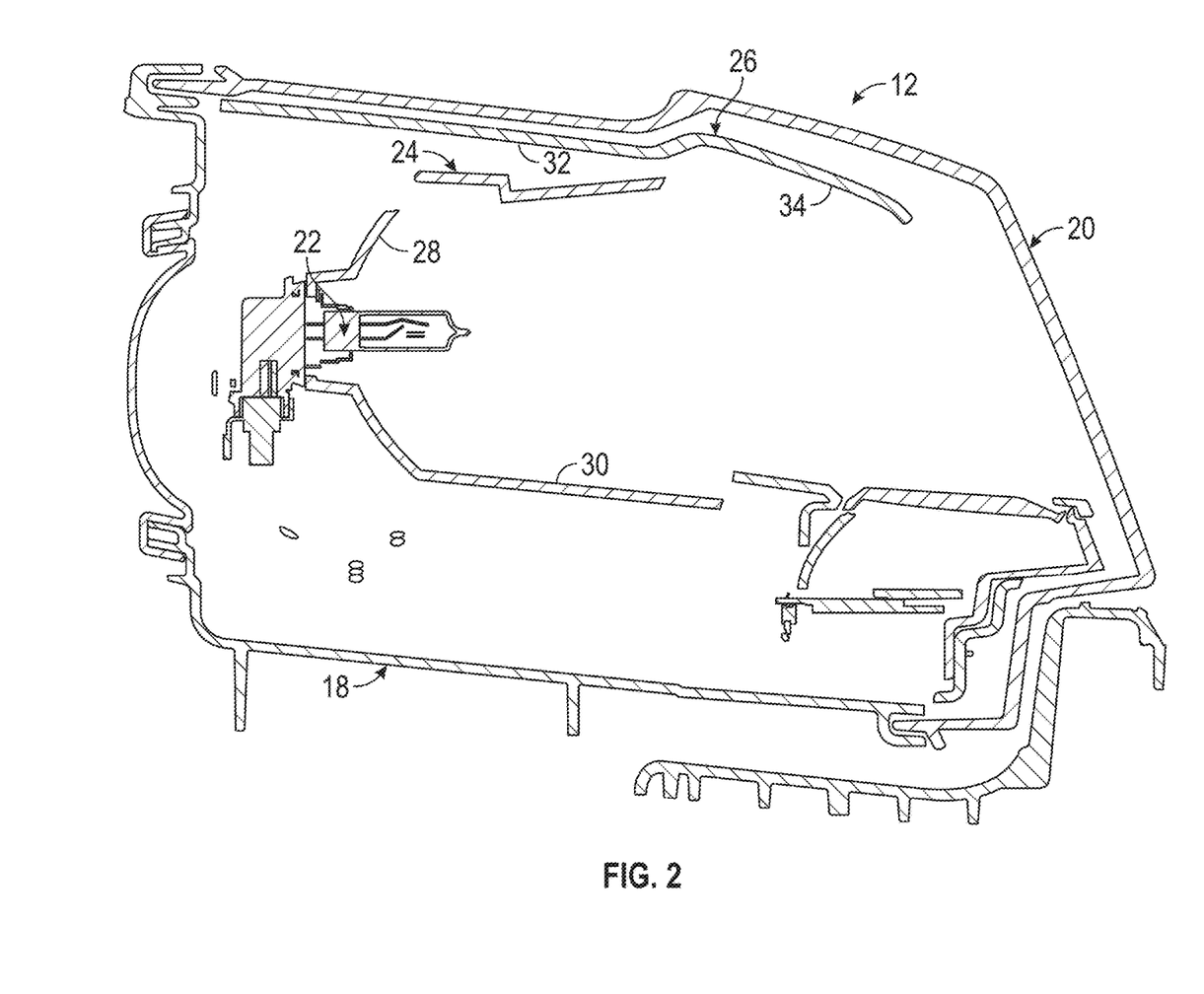
FIG. 2 is a cross-sectional view of one of the lighting assemblies of FIG. 1.
Figure 3:
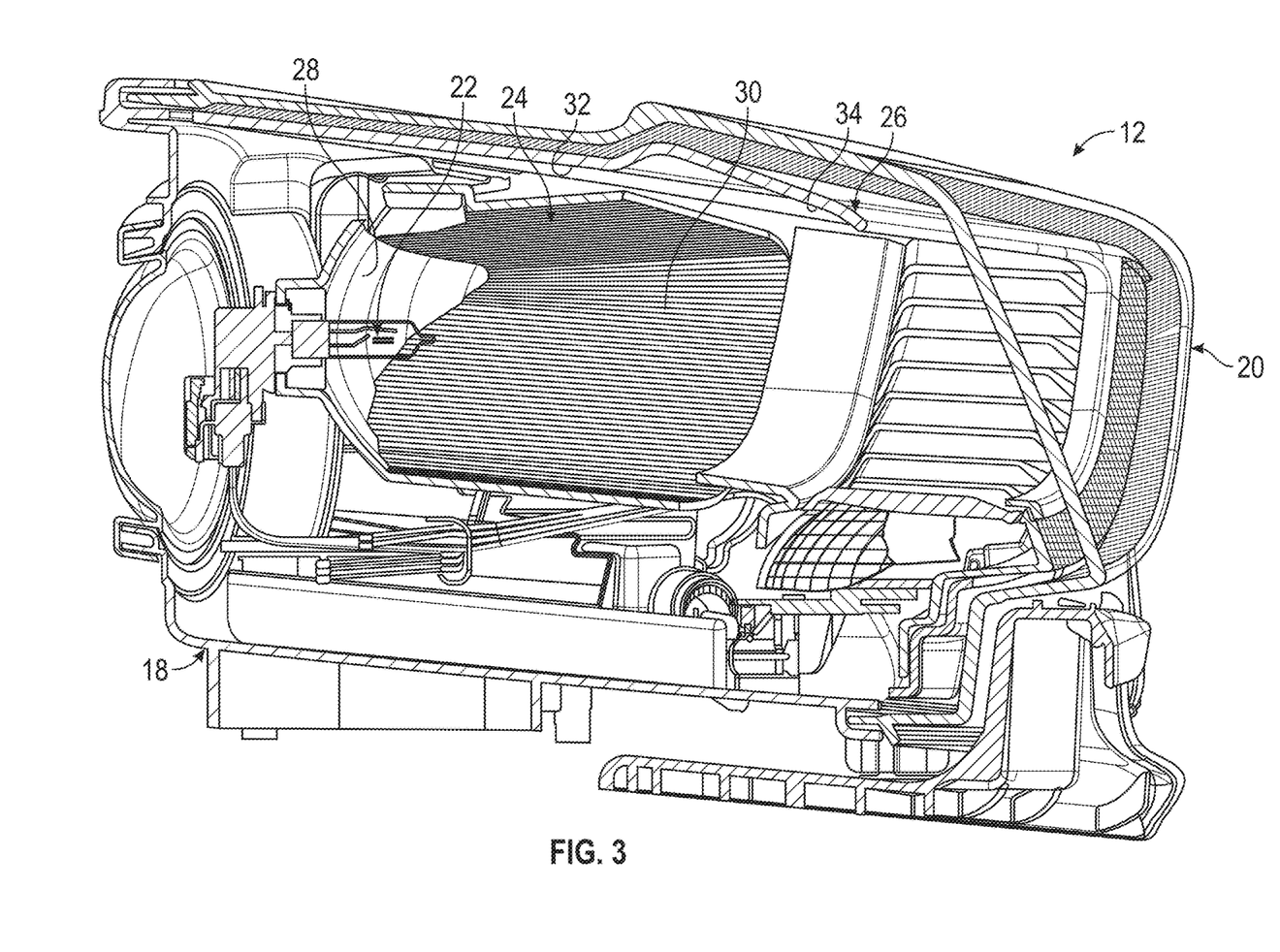
FIG. 3 is a perspective cross-sectional view of the lighting assembly of FIG. 2.

FIGS. 2 and 3, with continued reference to FIG. 1, illustrate additional details of the lighting assembly 12. In an embodiment, the lighting assembly 12 includes a housing 18, a lens 20, one or more light sources 22, a reflector body 24, and a bezel 26.

The housing 18 encloses and/or supports the lens 20, each light source 22, the reflector body 24, and the bezel 26. In an embodiment, the housing 18 is sized and shaped to provide an aerodynamic and aesthetically pleasing design. However, the size and shape of the housing 18 are not intended to limit this disclosure. The housing 18 may be made of polymeric materials, metallic materials, or a combination of such materials.

The lens 20 may be clear or translucent for permitting light emitted from the light source 22 to escape from the lighting assembly 12 to the outside environment. The lens 20 may be made of polymeric materials or any other suitable materials. The size and shape of the lens 20 are not intended to limit this disclosure.

Although a single light source 22 is depicted in FIGS. 2 and 3, it should be understood that the lighting assembly 12 could include a multitude of light sources. The light source 22 may be an incandescent bulb, a halogen bulb, or a light emitting diode (LED). Other light sources could also be utilized within the scope of this disclosure. The light source 22 may be positioned within the housing 18 and configured for emitting light therefrom for directing the light through the lens 20. Light generated by the light source 22 generally passes through the lens 20 to the outside environment when the light source 22 is illuminated. The light source 22 may be powered by a vehicle power supply system and may be controlled by a vehicle lighting control module, for example.

The reflector body 24 generally surrounds the light source 22 and is used to reflect the light emitted by the light source 22. The reflector body 24 may extend in front of the light source 22 to help reflect the light. The reflector body 24 may be made of a polymeric material or other suitable materials. It should be understood that the reflector body 24 may be one or more separate components disposed within the housing 18. The size and shape of the reflector body 24 are not intended to limit this disclosure.

In an embodiment, the reflector body 24 includes both a reflective surface 28 that is configured to reflect light from the light source 22 and a non-reflective surface 30 that is not configured to reflect light from the light source 22. As further discussed below, providing both reflective and non-reflective surfaces on the reflector body 24 may reduce glare and increase the overall aesthetics of the reflector body 24.

The bezel 26 is also positioned within the housing 18 and may be disposed about portions of the reflector body 24. In an embodiment, portions of the bezel 26 are disposed axially between the reflector body 24 and the lens 20. It should be understood that the bezel 26 may be one or more separate components disposed within the housing 18. The size and shape of the bezel 26 are not intended to limit this disclosure.

The bezel 26 generally functions as a decorative trim of the lighting assembly 12 but may also be used to reflect light. For example, like the reflector body 24, the bezel 26 may include both a reflective surface 32 that is configured to reflect light from the light source 22 and a non-reflective surface 34 that is not configured to reflect light from the light source 22. As further discussed below, providing both reflective and non-reflective surfaces on the bezel 26 may reduce glare and increase the overall aesthetics of the bezel 26.

Figure 4:
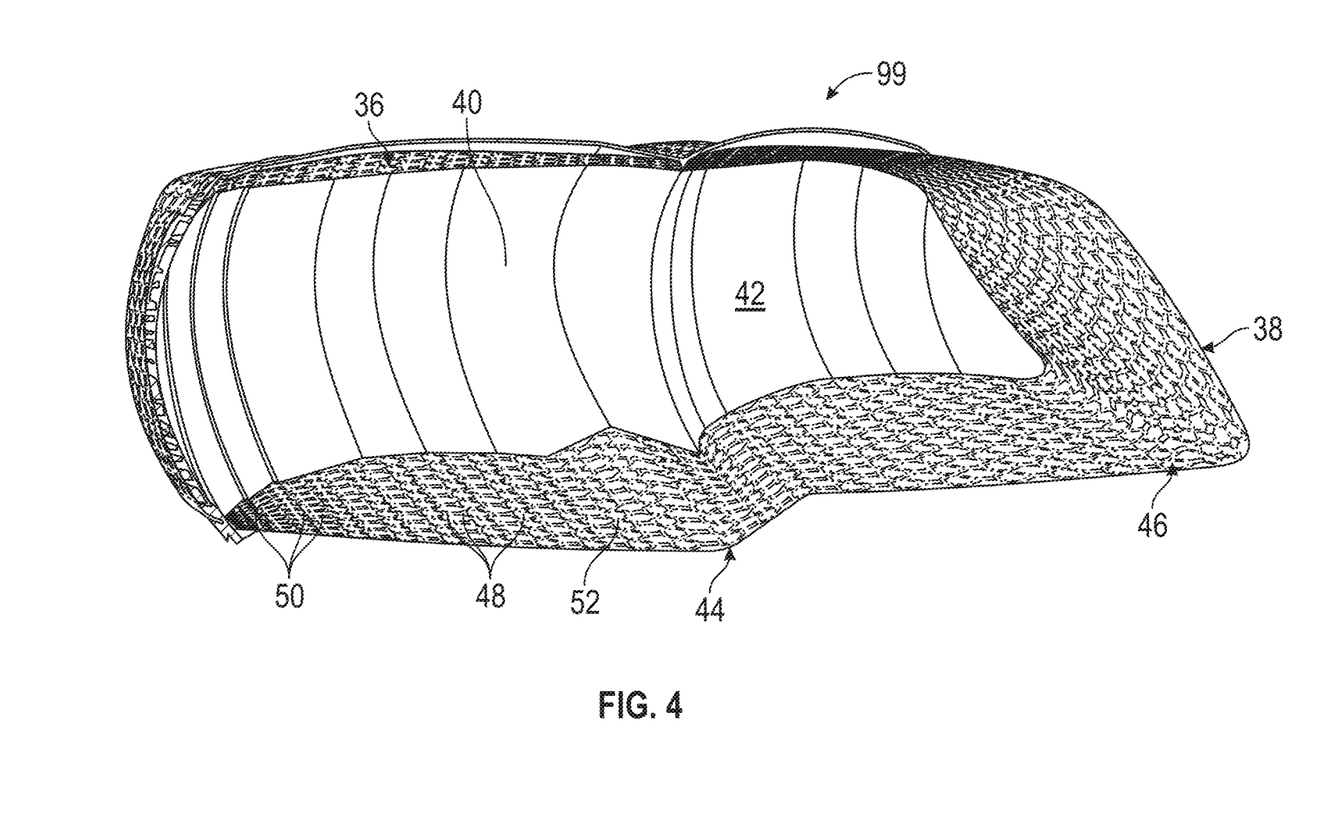
FIG. 4 illustrates an exemplary lighting component of a vehicle lighting assembly.
Figure 5A:
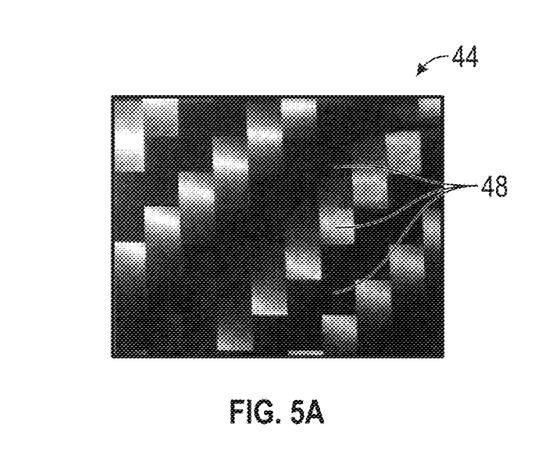
FIGS. 5A, 5B, 5C, and 5D illustrates exemplary micro-patterns that can be formed on lighting components of a vehicle lighting assembly.
Figure 5B:
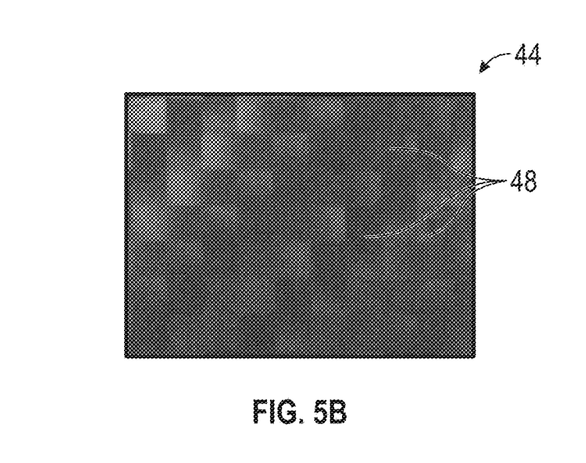
Figure 5C:
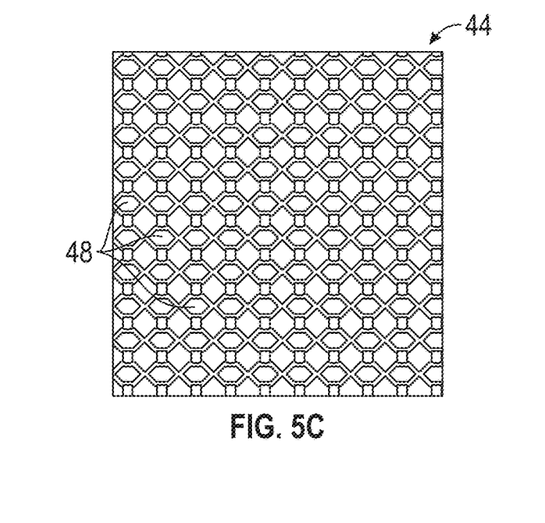
Figure 5D:
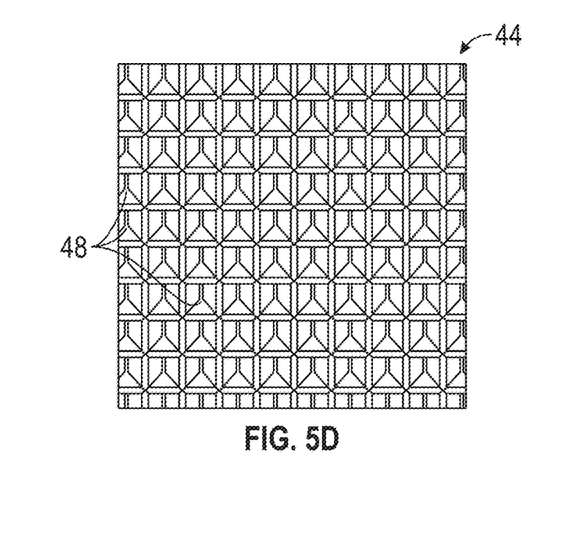

FIG. 4 illustrates an exemplary lighting component 99 of the vehicle lighting assembly 12. In an embodiment, the lighting component 99 is a reflector body of the lighting assembly 12. In another embodiment, the lighting component 99 is a bezel of the lighting assembly 12. The lighting component 99 could be any component of the lighting assembly 12 for which it is desirable to reduce glare and increase the aesthetic appearance of the component.

The lighting component 99 includes a rear surface 36 and a ledge 38 that protrudes outwardly from the rear surface 36. In an installed position, the rear surface 36 generally faces toward the lens 20 of the lighting assembly 12.

A metallic layer 40 is provided on the lighting component 99. In an embodiment, the metallic layer 40 is secured to the rear surface 36 of the lighting assembly. The metallic layer 40 could alternatively or additionally be disposed at other locations of the lighting component 99. The metallic layer 40 gives the rear surface 36 of the lighting component 99 a metallic appearance and establishes a reflective surface 42.

The metallic layer 40 therefore reflects light that strikes the rear surface 36 back away from the rear surface 36.

In an embodiment, the metallic layer 40 is an aluminum film; however, other metallic films could also be utilized. In another embodiment, the metallic layer 40 is a partial vacuum metalized film that is applied on the rear surface 36, such as by using an adhesive. The adhesive may be a pressure sensitive adhesive or any other type of adhesive. In yet another embodiment, the metallic layer 40 is a direct metallization layer.

A micro-pattern 44 may be formed on the lighting component 99. In an embodiment, the micro-pattern 44 is formed on the ledge 38 of the lighting component 99. The micro-pattern 44 could alternatively or additionally be disposed at other locations of the lighting component 99. The micro-pattern 44 reduces glare and therefore establishes a non-reflective surface 46 of the lighting component 99. The micro-pattern 44 may additionally give the lighting component 99 a more decorative and aesthetically pleasing appearance.

In an embodiment, the micro-pattern 44 includes texturing that is molded or otherwise formed into the ledge 38. In another embodiment, the micro-pattern 44 includes diffraction gratings 48. The diffraction gratings 48 are configured to split and diffract light into several beams travelling in different directions. In an embodiment, the diffraction gratings 48 include a plurality of ridges 50 that are configured to split/diffuse light, thus helping to establish the non-reflective surface 46 of the lighting component 99. The micro-pattern 44 may embody various designs and configurations. Non-limiting examples of micro-patterns 44 that include diffraction gratings 48 are illustrated in FIGS. 5A-5D.

The lighting component 99 may additionally include a coating 52 applied on the micro-pattern 44. In an embodiment, the coating 52 includes a phosphor mixture. The coating 52 may be applied over the micro-pattern 44 to add coloring to the micro-pattern 44. Once excited by a light source (see, e.g., light source 22 of FIGS. 2-3, the sun, and/or any other light source), the coating 52 may emit light that provides a glowing effect having a desired color.

The phosphor mixture of the coating 52 may include one or more phosphorescent materials. In an embodiment, the coating 52 includes long persistence phosphors that are capable of storing an activation emission and releasing light gradually, for a period of several minutes or hours, for example, once the activation emission is no longer present. Accordingly, the coating 52, when utilized within the lighting component 99 described herein, may continually illuminate in response to excitation by a light source. The periodic absorption of the activation emission from the excitation source may provide for a substantially sustained charge of the long persistent phosphors to provide for a consistent passive illumination.

The phosphor mixture included within the coating 52 may include alkaline earth aluminates and silicates, for example doped di-silicates, or any other compound that is capable of emitting light for a period of time once an activation emission is no longer present. The phosphor mixture of the coating 52 may be doped with one or more ions, which may correspond to rare earth elements, for example, $Eu^{2}+$, $Tb^{3+}$ and/or $Dy^3$. In an embodiment, the coating 52 includes a phosphor mixture having a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation. Of course, other phosphor mixtures are also contemplated within the scope of this disclosure.

Together, the micro-pattern 44 and the coating 52 may be provided to achieve various decorative effects within the lighting component 99. For example, in an embodiment, white light from a light source may strike the micro-pattern 44 that has been coated with the coating 52 having the phosphor mixture, thereby resulting in the phosphor absorbing some of the violet/blue light and re-emitting the light in red. The light may then be split by the micro-pattern 44 (i.e., by the diffraction gratings 48) and reflected back through the coating 52, wherein the phosphor absorbs more violet/blue light and emits it as red. This phenomenon is known as a stokes shift, and the overall effect is that violet/blue colors are reduced in the lighting component 99 while yellow/red/deep red colors are enhanced.

Figure 6:
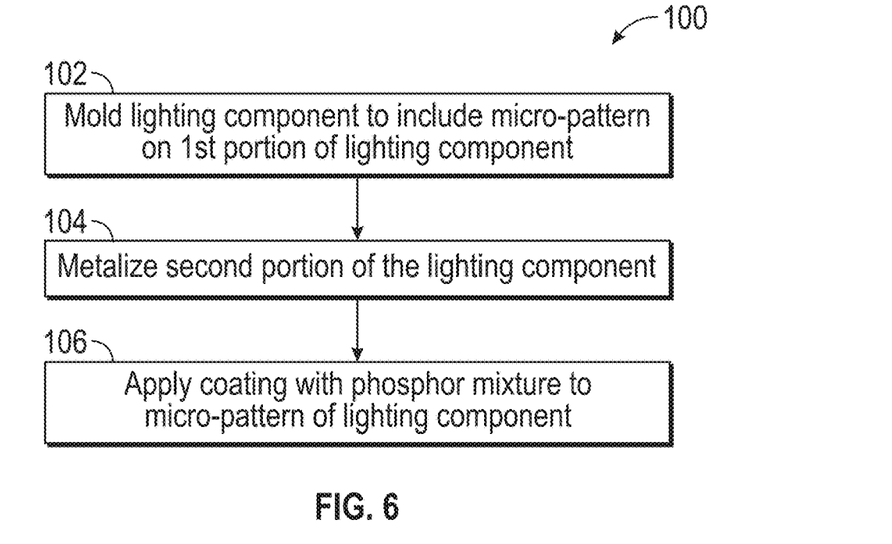
FIG. 6 schematically illustrates a method for constructing a vehicle lighting component that both reduces glare and increases the aesthetic appearance of the vehicle.

FIG. 6, with continued reference to FIGS. 1-5D, schematically illustrates a method 100 for constructing the lighting component 99 of the vehicle lighting assembly 12. First, at block 102, the lighting component 99 is molded in a molding process. The molding process may be an injection molding process or any other suitable molding process. The molding process may include forming the micro-patterns 44, including the diffracting gratings 48, on a first portion (e.g., the ledge 38) of the lighting component 99.

Figure 7:
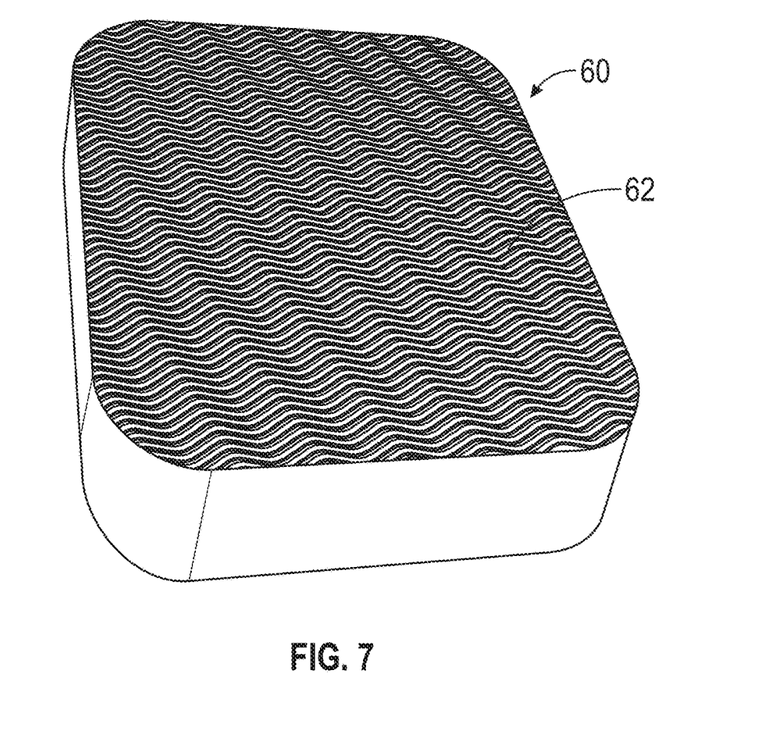
FIG. 7 illustrates an exemplary mold for use in the method of FIG. 6.

In an embodiment, a mold 60 have a laser etched pattern 62 is used to manufacture the lighting component 99 to include the micro-pattern 44 (see FIG. 7). Relatively complex patterns can be formed in the mold 60 by laser etching the pattern 62.

Depending on the material used to mold the lighting component 99, the mold 60 may be heated during the molding process. Heating the mold 60 may help the material flow better during the molding process.

Next, at block 104, a second portion (e.g., the rear surface 36) of the lighting component 99 may be metalized. For example, the metallic layer 40 may be applied to the rear surface 36 of the lighting component 99 using a partial vacuum deposition technique. Other techniques may also be suitable for applying the metallic layer 40. The metallic layer 40 establishes the reflective surface 42 of the lighting component 99.

Finally, the coating 52 having the phosphor mixture may be applied to the micro-pattern 44 of the lighting component 99 at block 106. The coating 52 may be applied using any known technique. As detailed above, the micro-pattern 44 reduces glare of the lighting component 99, and the coating 52 provides color and a decorative appearance to the lighting component 99.

The vehicle lighting assemblies described herein are capable of simultaneously reducing glare and increasing the aesthetic appearance of the assembly. The assemblies therefore offer increased styling flexibility over existing lighting assemblies.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle lighting assembly, comprising:
a housing;
a lens supported by the housing;
a lighting component including a reflector body and a bezel mounted inside the housing;
a metallic layer formed on a first portion of the lighting component to establish a reflective surface;
a micro-pattern formed on a second portion of the lighting component to establish a non-reflective surface; and
a coating that includes a phosphor mixture applied to the micro-pattern,
wherein the reflective surface and the non-reflective surface are part of the reflector body, and the bezel comprises a second reflective surface and a second non-reflective surface.

2. The vehicle lighting assembly as recited in claim 1, wherein the first portion is a rear surface of the lighting component.

3. The vehicle lighting assembly as recited in claim 1, wherein the second portion is a ledge of the lighting component.

4. The vehicle lighting assembly as recited in claim 1, wherein the metallic layer is a partially vacuum metalized film or a direct metallization layer.

5. The vehicle lighting assembly as recited in claim 1, comprising a light source for emitting light through the lighting component.

6. The vehicle lighting assembly as recited in claim 5, wherein the light source is a light emitting diode (LED).

7. The vehicle lighting assembly as recited in claim 1, wherein the micro-pattern includes a diffraction grating.

8. The vehicle lighting assembly as recited in claim 7, wherein the diffraction grating includes a plurality of ridges.

9. The vehicle lighting assembly as recited in claim 1, wherein the phosphor mixture includes at least one phosphorescent material.

10. The vehicle lighting assembly as recited in claim 1, wherein the phosphor mixture includes a long persistence phosphor.

11. The vehicle lighting assembly as recited in claim 1, wherein the metallic layer is applied to the first surface by an adhesive.

12. A method, comprising:
molding a lighting component of a vehicle lighting assembly, wherein molding the lighting component forms a micro-pattern in a first portion of the lighting component;
metalizing a second portion of the lighting component, wherein metalizing the second portion of the lighting component includes applying a metallic layer to the second portion using a partial vacuum deposition technique; and
applying a coating that includes a phosphor mixture to the micro-pattern.

13. The method as recited in claim 12, wherein molding the lighting component includes molding the lighting component within a mold having a laser etched pattern for forming the micro-pattern.

14. The method as recited in claim 13, wherein molding the lighting component includes heating the mold.

15. The method as recited in claim 12, wherein the first portion of the lighting component is a ledge and the second portion of the lighting component is a rear surface.

16. The method as recited in claim 12, wherein the lighting component is a reflector body or a bezel of the vehicle lighting assembly.

17. The method as recited in claim 12, wherein the coating includes a long persistence phosphor.

18. The method as recited in claim 12, wherein the micro-pattern establishes a substantially non-reflective surface of the lighting component.

19. A vehicle lighting assembly, comprising:
a vehicle lighting component;
a partially vacuum metalized film applied via an adhesive to a first portion of the vehicle lighting component to establish a reflective surface;
a micro-pattern formed on a second portion of the vehicle lighting component to establish a non-reflective surface;
a coating including a long persistence phosphor mixture applied to the micro-pattern; and
a light emitting diode (LED) for emitting light through the vehicle lighting component.

* * * * *